United States Patent [19]

Sharp

[11] 4,417,510

[45] Nov. 29, 1983

[54] SHEAR BALER

[75] Inventor: Allen B. Sharp, Ottumwa, Iowa

[73] Assignee: Al-Jon, Inc., Ottumwa, Iowa

[21] Appl. No.: 306,160

[22] Filed: Sep. 28, 1981

[51] Int. Cl.³ ............................................. B30B 9/32
[52] U.S. Cl. ................................. 100/98 R; 83/700;
100/218; 100/232; 100/249
[58] Field of Search ................... 100/98 R, 232, 218,
100/249; 83/923, 694, 698, 700

[56] References Cited

U.S. PATENT DOCUMENTS 3,134,286 5/1964 Judd ....................................... 83/700
4,337,694 7/1982 Brown ................................. 100/232

OTHER PUBLICATIONS

Brochure–Harris Press and Shear Corp. Apr., 1973.

Primary Examiner—Billy J. Wilhite
Attorney, Agent, or Firm—Allegretti, Newitt, Witcoff & McAndrews, Ltd.

[57] ABSTRACT

A shear baler is disclosed which is designed to efficiently process large volumes of desparate scrap metals into discrete, high intensity, compact bundles and includes novel structure for the facile mounting of shear blades in the movable shear ram and for preventing damage to the side mount ram due to scrap metal working around the ram head.

16 Claims, 8 Drawing Figures

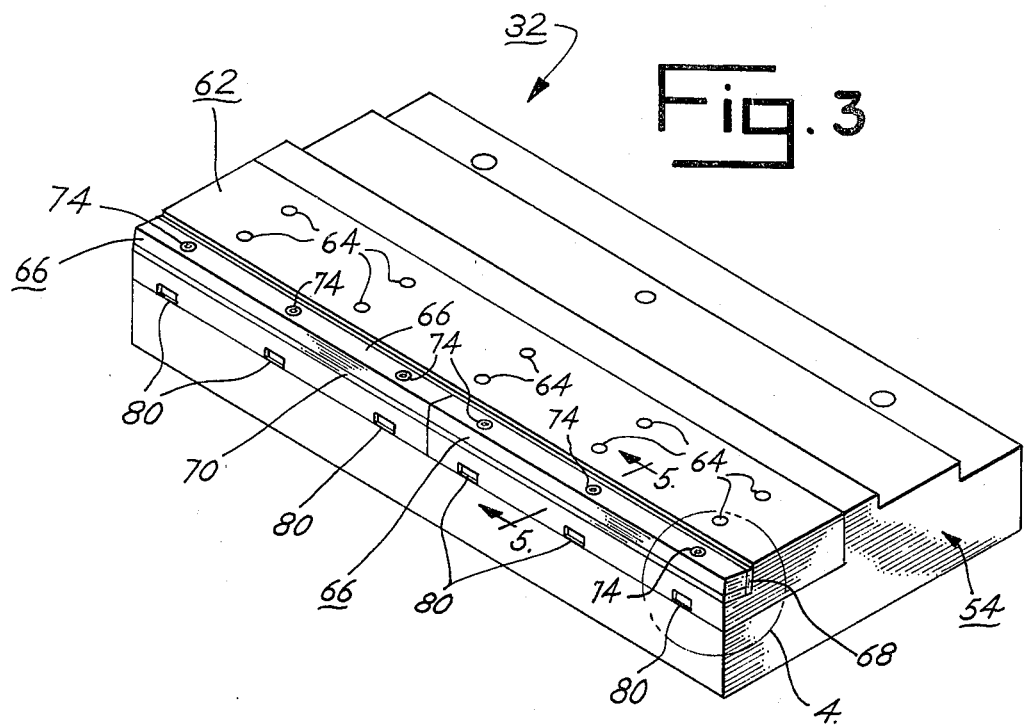
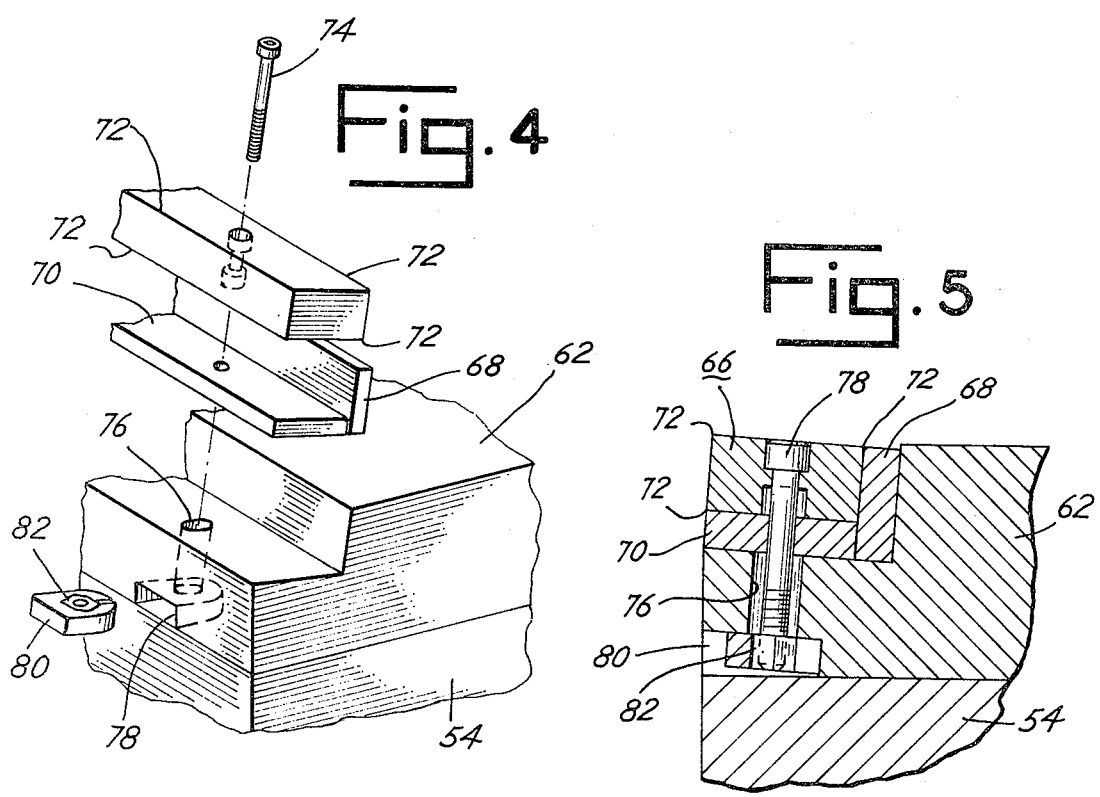

SHEAR BALER

BACKGROUND AND SUMMARY OF THE INVENTION

The present invention relates to shear balers, and more particularly, to shear balers for processing large volumes of diparate scrap metal, such as black sheet clips, loose steel, industrial skeleton sheets, trim stock, white goods, galvanized sheet and clips, stainless steel sheets, aluminum sheet, and miscellaneous auto sheet, into discrete, high density, compact bundles.

Prior shear balers have included a compression chamber wherein scrap metal is compressed, in a first direction, by the movement of a hydraulically actuated shear ram and then, in a second direction, by the movement of a hydraulically actuated side mounted ram. The scrap metal is introduced, from a hopper, into the compression chamber through an opening in the top wall of the chamber. The compressed bundles of scrap metal are ejected from the shear baler, by the side mounted ram, through a side opening that is closed, by a hydraulically actuated side gate during the time the scrap metal is being compressed, in the compression chamber.

Generally the pieces of scrap metal to be compressed project out of the compression chamber and back into the hopper before the movement of the shear ram is initiated. A fixed shearing blade is mounted on the edge of the top wall opening perpendicular to the path of movement of the shear ram. Another shearing blade is mounted on and along the upper, transverse edge of the shear ram, and cooperation between these shearing blades, as the shear ram proceeds along its path of movement, results in the shearing off of the initially projecting pieces of scrap metal. After the shear ram has completed its compressive movement, it remains at the end of its path of movement. The side mounted ram then begins and completes its compressive movement, with the paths of movement of the two rams being substantially perpendicular to each other. When the side mounted ram completes its compressive movement, the side gate opens, and the scrap metal, now compressed into the form of a bundle, is ejected from the compression chamber.

Shear balers are almost inadvarably operated in dirty, often hostile environments such as found in scrap yards. Because of the nature of their functions, they are, for the most part, relatively massive, heavy pieces of equipment that are designed to operate in such environments with a minimum of maintenance and repair. In the past, the shear balers have tended to have their "Achilles heels". The shearing blades, and particularly, the shearing blade mounted on the shear ram, are subject to hard wear and as a result, have had to be frequently replaced. Even when the shearing blades do not need to be replaced, the blades often have to be shimmed to compensate for the wear on the blades, the shear ram, and the bottom wall of the compression chamber and so that the necessary special relationship between the fixed and moving shearing blades can be maintained to assure proper shearing action. The shimming and replacement of the moving shearing blade was a time consuming operation and one that required the substantial dismantling of the shear ram.

Another longstanding problem was the damage caused by the pieces of scrap metal that worked their way around and past the compressive rams and particularly, the side mounted ram. In the past, it was the recognized practice to combat this problem by making the body of the compressive ram congruent to and substantially the same size as the ram head and by maintaining as close tolerances as practicable between the ram body and head and the surrounding protective housing. However, in spite of this practice and no matter how tightly the fit and tolerances between the ram head and body and the surrounding housing were maintained, pieces of metal would invariably work around the ram and tended to damage the actuating hydraulic cylinder positioned behind the compressive head. Such damage resulted in costly repairs and downtime.

It is a primary object of my present invention to provide an improved shear baler of the type described wherein the aforementioned disadvantages and problems are allieviate and overcome. Another object of my present invention is to provide an improved shear baler of the type described which includes novel means for mounting shear blades on the shear ram and wherein the replacement and shimming of the moving shear blades are greatly facilitated. This novel shear blade mounting means also holds the shearing edge of the shear blade at an angle of between 2° to 4°, with respect to the plane of the leading face of the shear ram, and this, it has been found, results in significantly improved shearing action.

Still another object of my invention is to provide improved shear baler of the type described wherein the side mounted ram is constructed so as to substantially eliminate any chance that scrap metal, working past the ram head, will cause damage to the actuating hydraulic cylinder. The spacing between the side mounted ram and its protective housing is relatively large, and the compressive ram itself is constructed so that any pieces of scrap metal working around the ram head will readily fall to the bottom of the housing where they can be easily removed through clean-out openings.

These and other objects, advantages, and features of my present invention wll become apparent from the following description of the preferred embodiment of my invention.

DESCRIPTION OF THE DRAWINGS

FIG. 3 is an enlarged perspective view of the shear ram of my present invention.

FIG. 4 is an enlarged, fragmentary view of that portion of the shear ram of FIG. 3 within the circle 4 of FIG. 3.

FIG. 5 is an enlarged cross-sectional view taken along the line 5—5 in FIG. 3.

Figure 1:
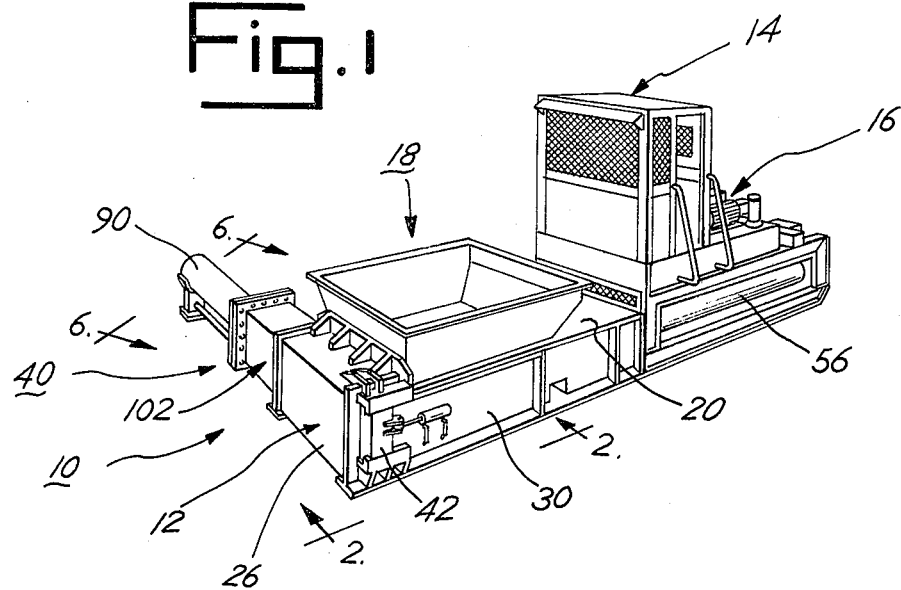
FIG. 1 is a perspective of my improved shear baler.

Throughout the various figures of the drawings, the same reference numerals will be used to designate the same parts of my improved shear baler. Moreover, when the terms "slide", "top", "bottom", "left", "right", "lefthand", and "righthand" are used herein, it is to be understood that these terms have reference to the structure illustrated in the drawings, as it would appear to a person viewing the drawings.

DESCRIPTION OF THE PREFERRED EMBODIMENT

Referring to FIG. 1, the improved shear baler of my present invention is shown generally at 10 and includes a main housing 12. A control cab 14 is mounted on the housing 12, provides protection for the operator and contains the controls and monitors needed to operate the shear baler 10. The power plant (i.e. the motors, hydraulic pumps, and hydraulic reservoir), indicated generally at 16, employed to operate the shear baler 10, is supported in the housing 12 behind, or to the right of, the control cab 14.

An upwardly opening hopper 18 is mounted on the top wall 20 of the housing 12 in front of, or to the left of, the cab 14, and receives the scrap metal to be processed in the shear baler 10. The hopper 18, power plant 16, and the control cab 14, (including the controls needed to control the operation of the power plant and shear baler 10) may be of conventional design and construction.

Figure 2:
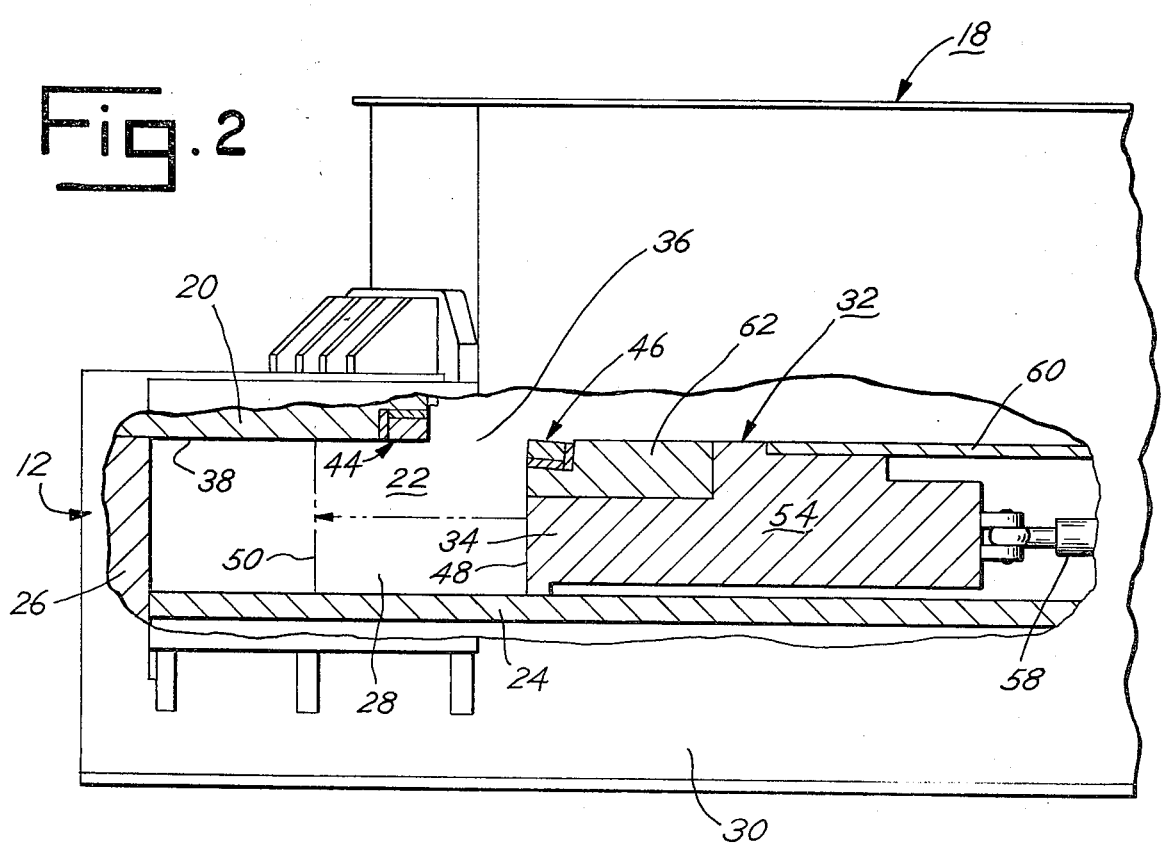
FIG. 2 is an enlarged, partial cross-sectional view taken along the line 2—2 of FIG. 1.

A compression chamber 22 is formed in the housing 12 and is defined by a bottom wall 24, an end wall 26, a first side wall 28, a second side wall 30 and the top wall 20. A hydraulically actuated shear ram 32 is disposed within the compression chamber 22 and is adapted to be moved back and forth in the compression chamber 22 from one end (i.e. the righthand end, as seen in FIG. 2) to the other end (i.e. left hand end, as seen in FIG. 2). The shear ram 32 includes a shear head 34 which is congruent to and which is substantially the same size as the transverse cross-section of compression chamber 22 (i.e. the cross-section perpendicular to the path of movement of the shear ram 32 in the compression chamber 22). The top wall 20 includes an opening 36 which, when unblocked by the shear ram 32, permits scrap metal to fall or otherwise be introduced from the hopper 18 into the one end of the compression chamber 22.

The first side wall 28 includes an opening 38 which is located immediately adjacent to the end wall 26. The opening 38 opens into other end of compression chamber 22 and is of a size that a hydraulically actuated, side mounted compression ram 40 may be moved through the opening 38 and into other end of the compression chamber 22.

The second side wall 30 includes an opening, not shown, that is the same shape and size as and is aligned with the opening 30 and with the central longitudinal axis of the side mounted ram 40 (i.e. the path of movement of the side mounted ram 40). During the compression of scrap metal in the compression chamber 22, the opening in the side wall 30 is closed by a hydraulically actuated side gate 42. This gate 42 is mounted on the exterior of the side wall 30 and is movable so that the opening in the side wall 30 can be unblocked to permit the ejection of a compressed bundle of scrap metal from compression chamber 22 by the side mounted ram 40.

When the shear ram 32 is moved to its first, rightmost position (farther to the right than as shown in FIG. 2), scrap metal may be introduced into the compression chamber 22 from the hopper 18. Frequently, pieces of the scrap metal project out the chamber through the opening 36. A fixed shear blade assembly 44 is mounted on the top wall 20, along the edge of the opening 36 that is adjacent to the other end of the compression chamber 22. The shear blade assembly 44 may be of conventional design and construction, and may be disposed at an angle with respect to the path of movement of the shear ram 32. A movable shear blade assembly, 46, further described hereinafter in detail, is mounted on and along the upper, transverse, leading edge of the ram head 34 and is designed to cooperate with the fixed shear blade assembly 44 to shear projecting pieces of scrap metal as the leftward movement of the shear ram 32 closes the opening 36.

Figure 6:
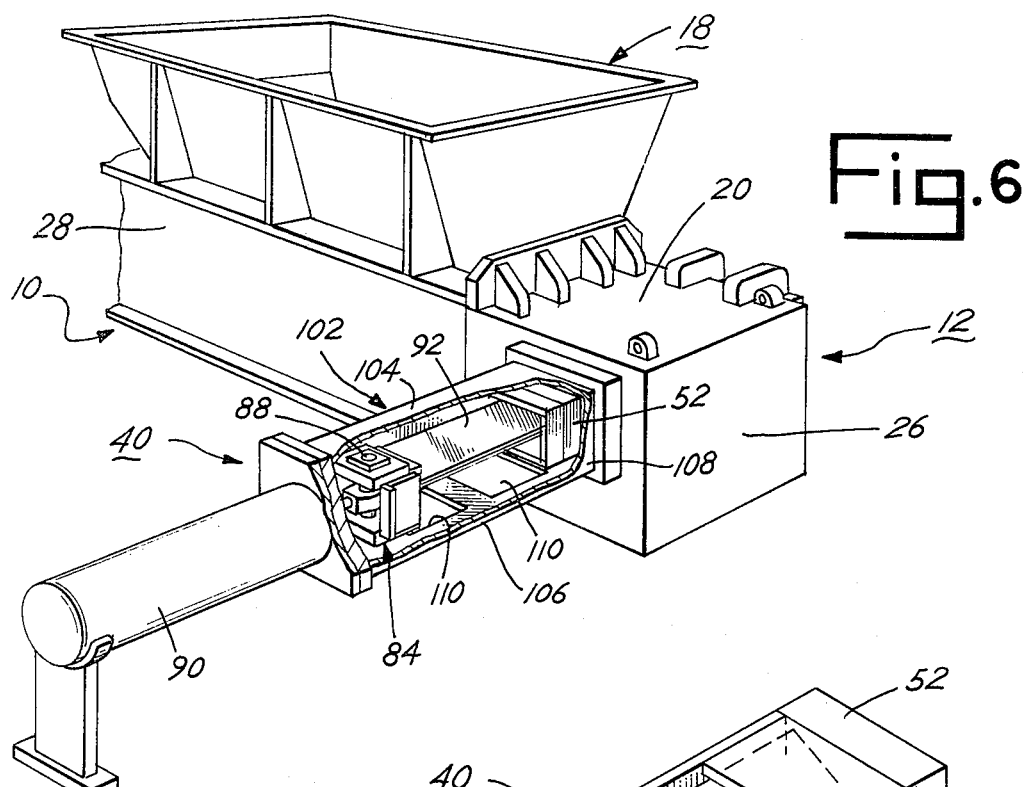
FIG. 6 is another partial view of the improved shear baler of my present invention, with a portion of the side mounted ram and its protective housing being broken away.

The scrap metal remaining in the compression chamber 22 is compressed against the end wall 26 by the continued leftward movement of the shear ram 32. This compression continues until the ram head 34 reaches its second, left-most position (i.e. until the leading face 48 of the ram head 34 is in the position shown by the phantom line 50 in FIG. 2 and is a predetermined distance from the end wall 26, which distance being the width of the openings in the side walls 28 and 30). Thereafter and while shear ram 32 remains in its second position, the side mounted ram 40 moves from its first position (as shown in FIGS. 2 and 6) where the leading face of its ram head 52 is parallel with and serves as a continuation of the plane of the side wall 28 to a second position where the leading face of the ram head 52 is adjacent to but spaced from the side gate 42. This path of movement of the side mounted ram 40 is substantially perpendicular to the path of movement of the shear ram 32 and serves to further compress the scrap metal in the other end of the compression chamber 22. When this compression is accomplished, the side gate 42 is opened and continued movement of the side mounted ram 40 results in the ejection of the now compressed bundle of scrap metal from the compression chamber 22 through the unblocked opening in the side wall 30. The side mounted ram 40 is then retracted to its first position and the shear ram 32 is moved rightward from its second position toward its first position. Continued rightward movement of the shear ram 32 exposes the opening 36 and permits additional scrap metal in the hopper 18 to fall into the one end of the compresson chamber 22. When the shear ram 32 reaches its first position, another cycle of operation can be commenced.

As noted above and as best seen in FIGS. 2–5, one of the advantageous aspects of my invention resides in the novel construction of the shear ram 32 which includes a main body 54. A hydraulic cylinder 56 (the end 58 of which is shown in FIG. 2) is connected with the right end of the body 54. Actuation of the cylinder 56 causes the body 54 to slide on the bottom wall 24 along the path of movement of the shear ram described above. The lefthand facing surface of body 54 defines, the lower portion of the leading face 48 of the ram head 34.

A slide plate 60 is associated with the body 54, adjacent to its upper, righthand end. The top of the plate 60 is flush with the top surface of the body 54 and serves to prevent scrap metal from dropping behind the shear ram 32.

The upper, leftward facing, transverse portion of the main body 54 is cut away. A blade block 62 is mounted in this cut-away portion of the body 54 and is secured to the body 54 by a plurality of countersunk bolts, shown at 64 in FIG. 3. The top surface of the blade block 62 is flush with and serves as a smooth continuation of the top surface of the main body 54 and the slide plate 60. The lefthand facing surface of the blade block 62 defines a smooth continued portion, the intermediate portion, of the leading face 48 of the ram head 34. The portions of the leading face 48 defined by the main body 54 and blade block 62 are being substantially vertical and are perpendicular to the path of movement of the shear ram 32. The length of the blade block 62, in a direction parallel to the path of the movement of the shear ram 32, is greater than the distance between the lefthand edge of the opening 36 (i.e. the fixed shear blade assembly 44) and the leftmost position of the leading face 48 of the shear head 34, shown by the phantom line 50 in FIG. 2).

The upper, leftward facing, transverse portion of the blade block 62 is cut away. The shear blade assembly 46 includes two identical shear blades 66 that are supported, end for end, by vertical blade seats 68 and horizontal blade seats 70 in this cut away portion of the blade block. Each shear blade 66 has a generally rectangular, transverse cross-section and has a shearing edge 72 formed along each of its corner edges. The seats 68 and 70 are of conventional construction, and have rectangular transverse cross-section.

The lower or bottom surface of the cut away portion of the blade block 62 is disposed at an angle between 2° and 4° with respect to the horizontal, with the lefthand edge of that surface being higher than the righthand edge, as best shown in FIG. 5. Consequently each of the shear blades 66 is also disposed at an angle with respect to the horizontal when it is mounted in the blade block 62. The dimensions of the shear blades 66 and the seats 68 and 70 are selected so that the leading or lefthand face of each of the shear blades 66 defines a smooth, continued portion, the upper portion, of the leading face 48 of the ram head 34. However unlike the other portions of the face 48, the leading or lefthand face of each of the shear blades 66 is not vertically disposed, but rather defines an angle of between 2°-4°, preferably 4°, with respect to the vertical, with its upper, exposed, leftmost shearing edge 72 being slightly to the right of its lower, leftmost shearing edge 72, as shown in FIG. 5. The dimensions of the shear blades 66 and the seats 68 and 70 are also selected so that the upper, exposed leftmost shearing edges 72 of each shear blade 66 lies within the plane defined by the top surfaces of the blade block 62 and main body 54.

A plurality of countersunk bolts 74 are used to mount the shear blades 66 on the blade block 62. An aligned and matching pair of circular bores are formed in the blade 66 and horizontal seats 70 to receive the bolts 74. Similarly a plurality of bores 76 are formed in the blade block 62 to receive the bolts 74,. The upper end of each bore 76 is in communication with the lower surface of the cut away portion of the blade block 62, and the lower end of each bore 76 is in communication with a slot 78 milled in lower surface of the blade block 62 adjacent to and extending into the leading face of the block 62. The longitudinal axes of the bores 76 are disposed at an angle of 2°-4° with respect to the vertical and are parallel with the leading faces of the shear blades 66. The transverse cross-section of each of the bores 76 is not circular but is elongated, with the "long" transverse axis of the bore 76 being parallel to the path of movement of the shear ram 32. This permits left and right adjustment of the shear blades 66 with respect to the blade block 62. A piece 80 of metal, that is congruent and substantially identical in size to the milled slot 78, is normally disposed within each of the slots. The center portion of each of the metal pieces 80 is designed to hold a conventional nut 82 against turning. The bolts 74 are threaded into these nuts 82 to secure the blades 66 and the seats 68 and 70 to the blade block 62.

Experience has demonstrated that significantly improved shearing can be achieved by disposing the shear blades 66 at an angle of 4°-6° with respect to the vertical and that contrary to what those working in the art might have otherwise expected, this angular disposition of the blades 66 does not present any unobjectionable "flag" of scrap metal. The improved shear blade mounting described above permits facile replacement of the shearing edges of the blades 66. All a person need do is unloosen and remove the bolts 74, and then rotate the shear blades 66 so that a new shearing edge 72 is disposed at the upper, lefthand corner of the blade block 62. The blade 66 may be readily shimmed in a similar manner. If it is necessary to shimm the shear ram 32 a signficant amount, this can be easily done by unloosening and removing the bolts 64 which hold the blade block 62 to the main body 54. In summary, the employment of the improved shear blade mounting structure of my present invention affords improved shearing action as well as greatly facilitating the replacement and shimming of the shear blades 66.

Figure 7:
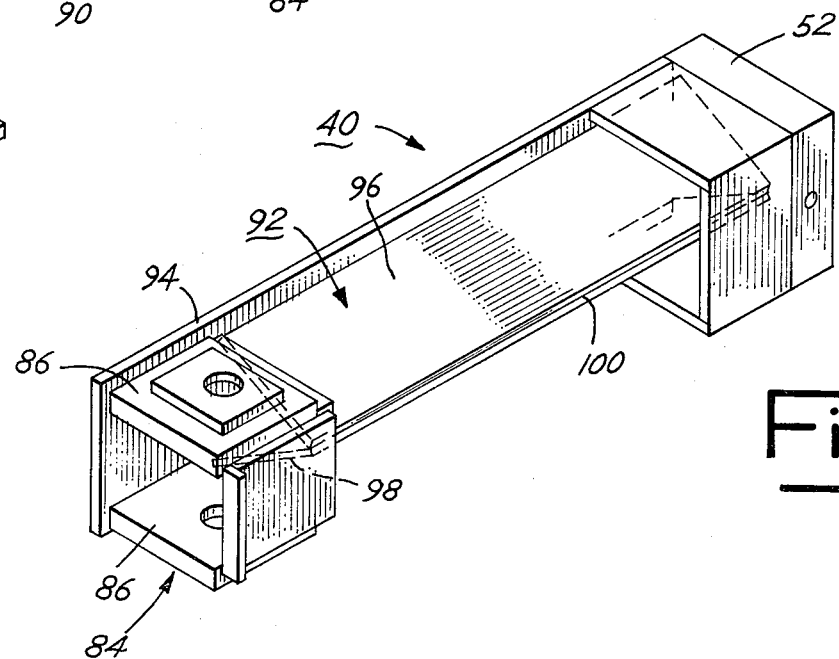
FIG. 7 is an enlarged perspective view of the side mounted ram of my present invention.

As noted above and as best illustrated in FIGS. 6-8, another of the advantageous aspects of my improved shear baler resides in the side mounted ram 40 which includes the ram head 52 and a cylinder mounting portion 84. The ram head 52 is spaced from the mounting portion 84 along the longitudinal axis (i.e. along the path of movement) of the ram 40 and is congruent to and substantially the same size as the opening 38 in the side wall 28. However, it is not critical that the tolerances between the ram head 52 and opening 38 be maintained as closely as had always been required in prior shear balers since it is not essential to attempt to preclude all scrap metal from working around that ram head 52.

Figure 8:
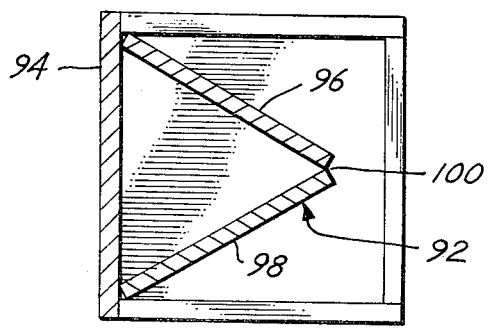
FIG. 8 is a cross-sectional view, transverse to the longitudinal axis of the side plate assembly of the ram shown in FIG. 7 taken looking right to left in FIG. 7.

The cylinder mounting portion 84 has a generally open rectangular cross-section and includes top and bottom walls 86 that receive and support a pin 88 used to interconnect the mounting portion 84 with a hydraulic cylinder not shown, positioned within a cylindrical housing 90. The mounting portion 84 is solely connected with the ram head 52 by means of a reinforced, elongated side plate assembly 92 that extends between them, and that has a generally triangular, transverse cross-section, as best seen in FIG. 8. The end portions of the plate assembly 92 serve as integral parts of the ram head 52 and the mounting portion 84.

This side plate assembly 92 includes a first plate 94 which is disposed so that its plane is perpendicular to the path of movement of the shear ram 32. The height of the plate 94 is substantially equal to the height of the ram head 52 (i.e. substantially equal to the height of the compression chamber 22 and the opening 38). Thus this plate 94 could function, if need be, as the end wall 26 should the shear ram 32 ever be inadvertently actuated while the side mounted ram 40 is in its second or extended position.

Second and third, substantially identical plates 96 and 98 extend between the head 52 and the mounting portion 84. One of the longitudinal edges of the second plate 96 is secured, as by welding, along the upper, longitudinal edge of the plate 94. One of the longitudinal edges of the third plate 98 is secured, as by welding, along the lower longitudinal edge of the plate 94. The other longitudinal edges, shown generally at 100, of the plates 96 and 98 are secured together, as by welding, near or adjacent to the central longitudinal axis of the side mounted ram 40.

A protective housing 102 has a generally rectangular, transverse cross-section and includes a top wall 104, a bottom wall 106 and side walls 108. The housing 102 is connected, at one end, to the side wall 28 and the projects substantially perpendicularily from the wall 28. The side mounted ram 40 is received and enclosed within the housing 102 when the ram 40 is in its first position. The spacing between the ram 40 and the walls of the housing 102 is sufficiently large to permit any piece of scrap metal that works past the ram head 53 to fall to the bottom of the housing 102. The shape and construction of the side plate assembly 92 are designed to facilitate the falling of scrap metal pieces.

The bottom wall 106 of the housing 102 includes a number of openings 110 which are large enough to permit a person to reach within the housing 102 and remove any pieces of scrap metal in the housing 102. Thus any scrap metal pieces that work past the ram head 52 will not come into contact with the hydraulic cylinder connected with the ram 40, but rather will fall harmlessly to the bottom of housing 102 where they can be readily and easily removed through the openings 110.

While only a single, preferred embodiment of my invention has been described hereinabove, those skilled in the art will recognize that that embodiment may be modified and altered without departing from the central spirit and scope of my invention. Thus the preferred embodiment described hereinabove is to be considered in all respects as illustrative and not restrictive, the scope of my invention being indicated by the appended claims, rather than by the foregoing description, and all changes which come within the meaning and range of equivalency of the claims are intended to be embraced herein.

I claim:

1. In an improved shear baler which is adapted to efficiently process large volumes of disparate scrap metals into discrete, high density, compact bundles and which comprises: a housing including a bottom wall, a first side wall, a second side wall, an end wall, and a top wall which define a compression chamber having a first end and a second end and having a uniform, transverse cross-section perpendicular to a longitudinal axis that extends between the first and second ends of the compression chamber and that is perpendicular to the plane of the end wall; a shear ram which has a leading face congruent to and substantially the same size as the cross-section of the compression chamber, which has a shear blade means mounted on and along the upper, transverse edge of the leading face, and which is movable, along a path of movement parallel to the longitudinal axis, between a first position wherein the leading face is adjacent to the first end of the compression chamber and a second position wherein the leading face is adjacent to the second end of the compression chamber and spaced a predetermined distance from the end wall; the top wall having an opening therein adjacent to the first end of the compression chamber through which scrap metal to be processed can be introduced into the compression chamber when the shear ram is in its first position; fixed shear blade means mounted on and along the edge of the top wall opening adjacent to the first end of the compression chamber and adapted to cooperate with the shear blade means on the shear ram to shear metal therebetween when the shear ram moves from its first position to its second position; the first side wall having a first opening therein adjacent to the second end of the compression chamber and the end wall, the first side opening having a width in the direction parallel to the longitudinal axis, substantially equal to the predetermined distance; the second side wall having a second side opening therein adjacent to the second end of the compression chamber and the end wall, the second side opening being aligned with and being congruent to and substantially the same size as the first side opening; a side mounted ram mounted adjacent to the first side wall so that its central axis is aligned with first and second side openings and is perpendicular to the longitudinal axis, the side mounted ram having a ram head which is substantially congruent to and substantially the same size as the first side opening and which is movable, along a path of movement parallel to its central axis, between a first position wherein the ram head is disposed within the first side opening so that the leading face of the ram head forms a continuation of the first side wall and second position wherein the ram head is disposed adjacent to the second side opening; a side gate mounted exterior to the compression chamber and adjacent to the second side opening, the side gate being movable between a first position wherein it overlies and closes the second side opening and a second position wherein it is disposed remote from the second side opening; first means for moving the shear ram between its first and second positions; second means for moving the side mounted ram between its first and second positions; third means for moving the side gate between its first and second positions; and means for controlling the operation of the first, second, and third moving means; the improvement comprising:

the shear ram including a body having a cut away portion in and along the upper, transverse edge of the leading face, with the plane of the leading face being spaced a certain distance from the fixed shear blade means on and along the edge of the top wall when the shear ram is in its second position; a blade block mounted in the cut away portion, the blade block having a cut away portion in and along its upper, transverse edge, with the length of the blade block, in the direction parallel to the longitudinal axis, being greater than said certain distance; at least one shear blade, with each shear blade having more than one shearing edge thereon; means for removably mounting and securing each shear blade in the cut away portion of the blade block so that one of its shearing edges is disposed along and defines at least a portion of the upper transverse edge of the leading face, so that each of the other shearing edges of the shear blade are spaced from the upper, transverse edge of the leading face, and so that each shear blade may be shimmed with respect to the blade block; and means for removably mounting and securing the blade block on the shear ram body so that the blade block may be shimmed with respect to the shear ram body.

2. The improved shear baler described in claim 1 wherein each of the shear blades has a generally rectangular cross-section, and wherein a shearing edge is formed at each corner of each shear blade.

3. The improved shear baler described in claim 2 wherein each shear blade is secured to the blade block so that shearing edge of the shear blade can be changed without unsecuring the blade block from the body of the shear ram.

4. In an improved shear baler which is adapted to efficiently process large volumes of disparate scrap metals into discrete, high density, compact bundles and which comprises: a housing including a bottom wall, a first side wall, a second side wall, an end wall, and a top wall which define a compression chamber having a first end and a second end and having a uniform, transverse cross-section perpendicular to a longitudinal axis that extends between the first and second ends of the compression chamber and that is perpendicular to the plane of the end wall; a shear ram which has a leading face congruent to and substantially the same size as the cross-section of the compression chamber, which has a shear blade means mounted on and along the upper, transverse edge of the leading face, and which is movable, along a path of movement parallel to the longitudinal axis, between a first position wherein the leading face is adjacent to the first end of the compression chamber and a second position wherein the leading face is adjacent to the second end of the compression chamber and spaced a predetermined distance from the end wall; the top wall having an opening therein adjacent to the first end of the compression chamber through which scrap metal to be processed can be introduced into the compression chamber when the shear ram is in its first position; fixed shear blade means mounted on and along the edge of the top wall opening adjacent to the first end of the compression chamber and adapted to cooperate with the shear blade means on the shear ram to shear metal therebetween when the shear ram moves from its first position to its second position; the first side wall having a first opening therein adjacent to the second end of the compression chamber and the end wall, the first side opening having a width, in the direction parallel to the longitudinal axis, substantially equal to the predetermined distance; the second side wall having a second side opening therein adjacent to the second end of the compression chamber and the end wall, the second side opening being aligned with and being congruent to and substantially the same size as the first side opening; a side mounted ram mounted adjacent to the first side wall so that its central axis is aligned with first and second side openings and is perpendicular to the longitudinal axis, the side mounted ram having a ram head which is substantially congruent to and substantially the same size as the first side opening and which is movable, along a path of movement parallel to its central axis, between a first position wherein the ram head is disposed within the first side opening so that the leading face of the ram head forms a continuation of the first side wall and a second position wherein the ram head is disposed adjacent to the second side opening; a side gate mounted exterior to the compression chamber and adjacent to the second side opening, the side gate being movable between a first position wherein it overlies and closes the second side opening and a second position wherein it is disposed remote from the second side opening; first means for moving the shear ram between its first and second positions; second means for moving the side mounted ram between its first and second positions; third meeans for moving the side gate between its first and second positions; and means for controlling the operation of the first, second, and third moving means; the improvement comprising:

the shear ram including a body having a leading face that is perpendicular to the longitudinal axis and having a cut away portion in and along the upper, transverse edge portion of its leading face; at least one shear blade mounted in the cut away portion, each shear blade including a leading face that serves as the upper, continuation of the leading face of the shear ram body and that terminates in a shearing edge along its upper transverse edge; and the plane of the leading face of the shear blade being disposed at an angle of between two and four degrees with respect to leading face of the shear ram body and being inclined toward the first end of the compression chamber.

5. The improved shear baler described in claim 4 wherein a blade block, having a leading face, is mounted in the cut away portion of the shear ram body; wherein the blade block has a cut away portion in and along the upper, transverse edge portion of its leading face; wherein the leading face of the blade block is co-planar with and serves as a continuation of the leading face of the shear ram body; and wherein the shear blade is mounted in the cut away portion of the blade block.

6. The improved shear baler described in claim 5 wherein each shear blade has more than one shearing edge thereon; wherein each shear blade may be mounted in the cut away portion of the blade block so that one of its shearing edges is disposed along and defines at least a portion of the upper transverse edge of leading face of the shear ram and so that each of the other shearing edges of the shear blade are spaced from the upper, transverse edge of the leading face of the shear ram.

7. The improved shear baler described in claim 6 wherein the shear blade has a generally rectangular cross-section and wherein a shearing edge is formed at each corner of the shear blade.

8. The improved shear baler described in claim 6 wherein the plane of the leading face of the shear ram is spaced a certain distance from the edge of the fixed shear blade means mounted on and along the top wall when the shear ram is in its second position; and wherein the length of the blade block, in the direction parallel to the longitudinal axis, is greater than that certain distance.

9. The improved shear baler described in claim 6 wherein the blade block is secured to the body of the shear ram; and wherein each shear blade is secured to the blade block so that shearing edge of the shear blade can be changed without unsecuring the blade block from the body of the shear ram.

10. In an improved shear baler which is adapted to efficiently process large volumes of disparate scrap metals into discrete, high density, compact bundles and which comprises: a housing including a bottom wall, a first side wall, a second side wall, an end wall, and a top wall which define a compression chamber having a first end and a second end and having a uniform, transverse cross-section perpendicular to a longitudinal axis that extends between the first and second ends of the compression chamber and that is perpendicular to the plane of the end wall; a shear ram which has a leading face congruent to and substantially the same size as the cross-section of the compression chamber, which has a shear blade means mounted on and along the upper, transverse edge of the leading face, and which is movable, along a path of movement parallel to the leading longitudinal axis, between a first position wherein the leading face is adjacent to the first end of the compression chamber and a second position wherein the leading face is adjacent to the second end of the compression chamber and spaced a predetermined distance from the end wall; the top wall having an opening therein adjacent to the first end of the compression chamber through which scrap metal to be processed can be introduced into the compression chamber when the shear ram is in its first position; fixed shear blade means mounted on and along the edge of the top wall opening adjacent to the first end of the compression chamber and adapted to cooperate with the shear blade means on the shear ram to shear metal therebetween when the shear ram moves from its first position to its second position; the first side wall having a first opening therein adjacent to the second end of the compression chamber and the end wall, the first side opening having a width, in the direction parallel to the longitudinal axis, substantially equal to the predetermined distance; the second side wall having a second side opening therein adjacent to the second end of the compression chamber and the end wall, the second side opening being aligned with and being congruent to and substantially the same size as the first side opening; a side mounted ram mounted adjacent to the first side wall so that its central axis is aligned with first and second side openings and is perpendicular to the longitudinal axis, the side mounted ram having a ram head which is substantially congruent to and substantially the same size as the first side opening and which is movable, along a path of movement parallel to its central axis, between a first side opening so that the leading face of the ram head forms a continuation of the first side wall and second position wherein the ram head is disposed adjacent to the second side opening; a side gate mounted exterior to the compression chamber and adjacent to the second side opening, the side gate being movable between a first position wherein it overlies and closes the second side opening and a second position wherein it is disposed remote from the second side opening; first means for moving the shear ram between its first and second positions; second means for moving the side mounted ram between its first and second positions; third means for moving the side gate between its first and second positions; and means for controlling the operation of the first, second, and third moving means; the improvement comprising:

the side mounted ram including a mounted portion that is connected with the second moving means and that is aligned with the ram head along the central axis of the side mounted ram; a continuous side plate that extends between and interconnects the ram head and mounting portion and that is disposed transverse to the longitudinal axis and adjacent to the first end of the compression chamber, with the vertical dimension of the side plate being substantially equal to the vertical dimension of the ram head; reinforcing means that are secured to the one side of the side plate adjacent the end wall, that extend along substantially the entire length of the side plate, and that project from the plane of the one side of the side plate a distance less than a maximum horizontal dimension of the ram head; and a housing adapted to enclose the ram head and mounting portion when the side mounted ram is in its first position and having a top wall, side wall and a bottom wall, with the bottom wall having at least one clean out opening therein which permits the removal of scrap metal that may have past around the ram head from the compression chamber.

11. The improved shear baler described in claim 10 wherein the reinforcing means and side plate provide the sole means for interconnecting the ram head and the mounting portion.

12. The improved shear baler described in claim 10 wherein the reinforcing means including a first plate having one longitudinal edge secured to the side plate along its upper longitudinal edge; wherein the second plate has one longitudinal edge secured to the side plate along its lower longitudinal edge; wherein the first and second plates are secured together along their other longitudinal edges; and wherein the other longitudinal edges of the second and third plates are disposed adjacent to the central axis of the side mounted ram.

13. The improved shear baler described in claim 10 wherein the shear ram includes a body having a cut away portion in and along the upper transverse edge of its leading face; wherein a blade block, having a leading face, is mounted in the cut away portion of the shear ram body; wherein the blade block has a cut away portion in and along its upper transverse edge of its leading face; wherein the leading face of the blade block is co-planar with and serves as a continuation of the leading face of the shear ram body; and wherein at least one shear blade is mounted in the cut away portion of the blade block; wherein each shear blade has more than one shearing edge thereon, with each shear blade being mounted in the cut away portion of the blade block so that one of its shearing edges is disposed along and defines at least a portion of the upper transverse edge of the leading face of the shear ram and so that each of the other shearing edges of the shear blade are spaced from the upper, transverse edge of the leading face of the shear ram.

14. The improved shear baler described in claim 10 wherein each of the shear blades has a generally rectangular cross-section; and wherein a shearing edge is formed at each corner of each shear blade.

15. The improved shear baler described in claim 10 wherein the shear ram includes a body having a leading face that is perpendicular to the longitudinal axis and having a cut away portion in and along its upper, transverse edge; wherein at least one shear blade is mounted in the cut away portion, with each shear blade including a leading face that serves as a continuation of the leading face of the shear ram and that terminates in a shearing edge along its upper transverse edge, with the plane of the face of the shear blade being disposed at an angle of between two and four degrees with respect to leading face of the shear ram body and being inclined toward the first end of the compression chamber.

16. The improved shear baler described in claim 15 wherein a blade block is mounted in the cut away portion of the body of the shear ram; wherein the leading face of the blade block is co-planar with and serves as a continuation of the leading face of the shear ram body; and wherein the shear blade is mounted in the cut away portion of the blade block.

* * * * *